United States Patent [19]
Ballinger

[11] Patent Number: 5,482,542
[45] Date of Patent: Jan. 9, 1996

[54] LIQUID VAPOUR SEPARATOR

[75] Inventor: Ian A. Ballinger, Wolverhampton, Great Britain

[73] Assignee: Dowty Boulton Paul Limited, Wolverhampton, United Kingdom

[21] Appl. No.: 226,892

[22] Filed: Apr. 13, 1994

[30] Foreign Application Priority Data

Dec. 24, 1993 [GB] United Kingdom .................... 9326401

[51] Int. Cl.$^6$ ................................................. B01D 19/00
[52] U.S. Cl. ............................. 96/204; 96/215; 96/220
[58] Field of Search ............................. 96/189–192, 204, 96/215, 220; 244/172; 102/377

[56] References Cited

U.S. PATENT DOCUMENTS

| | | | |
|---|---|---|---|
| 2,061,517 | 11/1936 | Kenny | 96/204 X |
| 2,809,712 | 10/1957 | Muller | 96/190 X |
| 2,868,315 | 1/1959 | Chaple et al. | 96/190 |
| 3,008,538 | 11/1961 | Glasgow | 96/190 |
| 3,212,232 | 10/1965 | McMinn | 96/190 X |
| 4,539,023 | 9/1985 | Boley | 96/190 X |

FOREIGN PATENT DOCUMENTS 1568275 5/1980 United Kingdom .................... 96/204

Primary Examiner—Richard L. Chiesa
Attorney, Agent, or Firm—Banner & Allegretti, Ltd.

[57] ABSTRACT

A tank for propellant in a space vehicle includes a trap defined by two walls which are substantially permeable to liquid but not to vapour. One wall (16) allows liquid to flow into the trap. The other (7,8) allows liquid to flow out via an outlet port. Vapour in the trap escapes via a vent (19,20). The wall (16) which allows liquid to flow to the outlet include a plurality of plates (1) clamped together. The surfaces (9) of the plates (1) are grooved such that plate surfaces engage to form fine passages (10) permeable to liquid but not vapour.

9 Claims, 1 Drawing Sheet

LIQUID VAPOUR SEPARATOR

BACKGROUND OF THE INVENTION

This invention relates to liquid-vapour separators of the capillary separation type, and to propellant tanks for space vehicles incorporating such liquid-vapour separators.

Known propellant tanks for space vehicles make use of liquid-vapour separators of the capillary separation type in which surface tension forces inhibit vapour flow whilst preferentially allowing liquid flow through fine passages. Fine mesh with micron size apertures produces the required surface tension forces to separate liquid and vapour, and this is incorporated in a liquid collecting gallery within an aft section of the tank through which liquid propellant is extracted. Additionally, an internal bulkhead may be provided which divides the tank into forward and aft sections and incorporates fine mesh that allows the flow of liquid from the forward to the aft section where the liquid is trapped in contact with the collecting gallery. The bulkhead also incorporates a vent stack with fine apertures which vent vapour from the aft section to the forward section as the aft section fills with liquid from the forward section. This design of tank involves a complex assembly to which the fine mesh is supported.

A propellant tank for a space vehicle is disclosed in GB 1568275 which makes use of a liquid separator comprising a plurality of annular discs compressed in a stack with radially directed recesses formed in their cooperating surfaces so as to define fine passages through which liquid flows. A number of such stacks are interconnected by pipework and located around the periphery of the tank to extract liquid from it. This type of liquid-vapour separator is more robust and easier to assemble and maintain compared with mesh-type liquid-vapour separators. However, the tank of GB 1568275 does not incorporate a bulkhead that divides the tank into sections, with one section trapping liquid in contact with the liquid-vapour separator.

SUMMARY OF THE INVENTION

An object of the present invention is to provide an improved liquid-vapour separator of the capillary separation type for use in a propellant tank of a space vehicle.

According to the present invention, a liquid-vapour separator comprises a liquid trap having a first liquid-vapour separator wall through which liquid flows to a liquid outlet, a second liquid-vapour separator wall through which liquid flows into the trap, and a vapour vent located so that vapour within the trap collects therein and is vented from the trap as liquid flows into the trap, characterised in that the first liquid-vapour separator wall comprises a plurality of separator plates clamped together with the engaging surfaces of adjacent plates formed with liquid-vapour separator passages therebetween dimensioned so as to inhibit vapour flow whilst preferentially allowing liquid flow.

Preferably, the first liquid-vapour separator wall is annular and is surrounded by a third liquid-vapour separator wall so as to define a gallery therebetween which is in communication with the liquid outlet, the third liquid-vapour separator wall, like the first, comprises a plurality of separator plates clamped together with the engaging surfaces of adjacent plates formed with liquid-vapour separator passages therebetween dimensioned so as to inhibit vapour flow whilst preferentially allowing liquid flow into the gallery.

Preferably, a liquid-vapour impermeable divider wall is incorporated within the first tubular liquid-vapour separator wall so as to extend laterally thereof and divide the space therein into a liquid trap volume and an outlet column which are connected via the gallery for the flow of liquid from the liquid trap volume to the outlet volume.

Preferably, the separator plates of the first and third liquid-vapour separator walls are clamped together by common clamping means comprising elongate tensile members which extend laterally of the separator plates through the gallery.

BRIEF DESCRIPTION OF DRAWINGS

The invention will now be described by way of example with reference to the accompanying drawings in which.

DETAILED DESCRIPTION OF A PREFERRED EMBODIMENT

Figure 1:
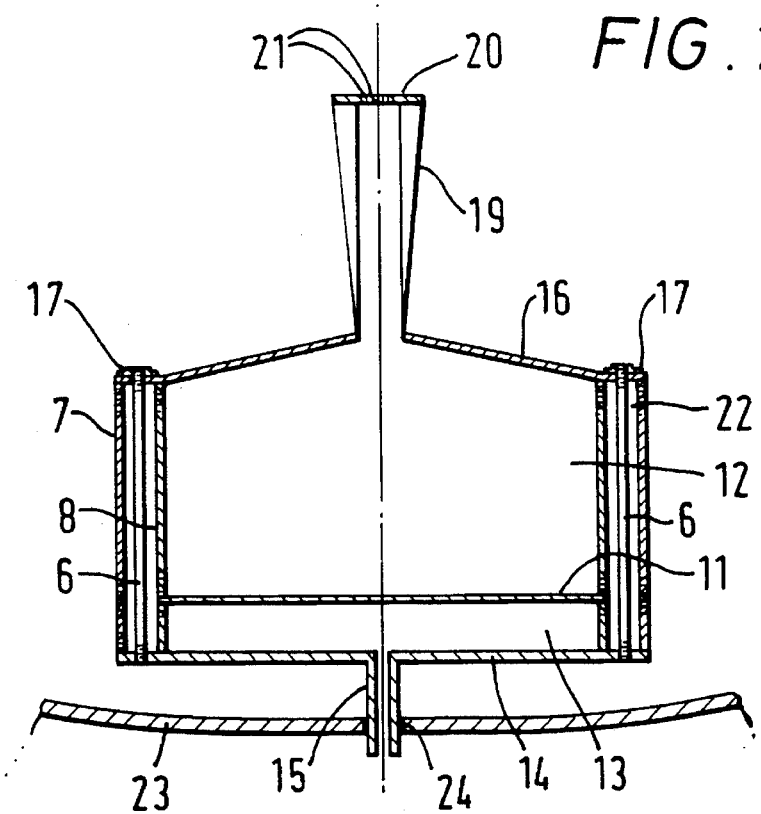
FIG. 1 is an axial section through a liquid-vapour separator according to the invention.
Figure 2:
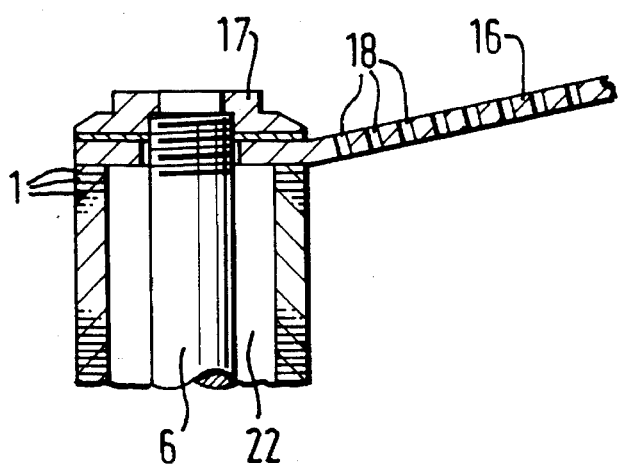
FIG. 2 is a portion of FIG. 1 shown on an enlarged scale.
Figure 3:
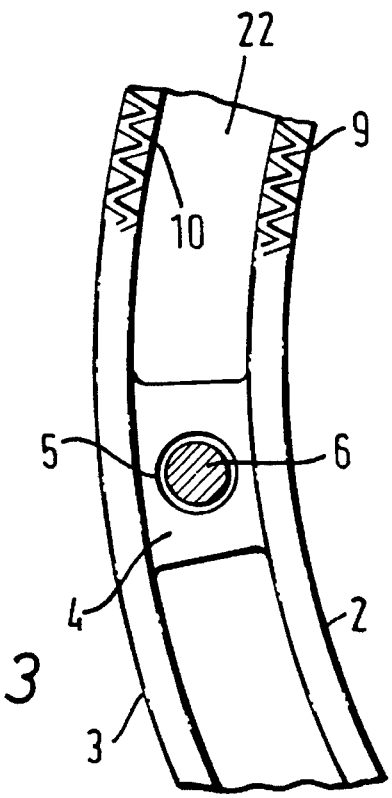
FIG. 3 is a horizontal section of FIG. 2.

The main body of the separator consists of a stack of ring-shaped plates, each consisting of an inner ring 2 and an outer ring 3 joined by a set of intermediate webs 4. The webs 4 are aligned axially and formed with holes 5 to receive compression bolts 6 which serve to clamp the plates 1 together so that the inner and outer rings 2,3 form respective inner and outer walls 8,7. An axially directed side face 9 of each ring 2,3 is etched with a pattern of radially directed recesses 10 which cooperate with the planar face of the adjacent ring 2,3 so as to form a plurality of fine passages that extend through the width of both walls 7,8.

One of the plates 1 at an intermediate height in the stack has a central portion 11 which extends across the full radial width of the inner ring 2 so as to divide the space within the inner wall 8 into an upper trap volume 12 and a lower outlet volume 13. The bottom of the stack is closed by a disc 14 to which the bolts 6 are connected at their lower end, and which is formed with a central outlet duct 15. The top of the stack is closed by a cover disc 16 through which the bolts 6 extend and which is engaged by compression caps 17 fitted to the ends of the bolts.

The cover disc 16 is formed like a screen with a plurality of fine apertures 18 which are preferably etched before the cover is given a slightly conical form, rising to a central region which is provided with a vent tube 19. The vent tube widens radially towards its top and is closed at the top by a disc 20 etched with fine apertures 21 that are larger than any of the other apertures in the cover disc 16 or the walls 7,8.

All the components of the liquid-vapour separator are preferably made of titanium for lightness and strength suitable in space vehicle applications.

When used in the propellant tank 23 of a space vehicle, as indicated in FIG. 1, the liquid-vapour separator is mounted within the tank, for example, in the aft end of the tank, with the outlet duct 15 connected to a propellant outlet 24 of the tank. Propellant filling the separator and tank, flows to the outlet duct 15 via the annular gallery 22 between the inner and outer annular walls 7,8, and on through the lower section of the inner wall 7 into the lower outlet volume 13. Propellant flows into the gallery 22 from the trap volume 12 through the fine apertures in the upper section of the inner annular wall 7, and from outside of the separator through the fine apertures in the outer annular wall 8 if propellant is in contact with these walls 7,8. Propellant flowing from the trap volume 12 is replenished by propellant flowing through the apertures 18 in the cover disc 16, but under some flight conditions of a space vehicle, there may be no propellant in contact with the outer surface of the cover disc 16, whereupon vapour and gas will be drawn through the apertures into the trap volume 17. The finer apertures in the side walls 7,8 prevent vapour and gas from passing through them under normal operating conditions, thus if there is no propellant in contact with the outer wall 8 outside of the separator, propellant flows from the trap volume 12 through the inner wall 8 into the gallery 22. When propellant settles in the tank around the separator again, propellant is drawn through the apertures 18 in the cover disc 16, and the vapour or gas in the trap volume 12 is vented through the apertures 21 in the disc 20 at the top of the vent tube 19 in which the vapour or gas collects. The trap volume 12 is therefore able to refill with propellant once flight conditions allow this to occur.

The trap volume 12 and outlet volume 13 may contain baffles, preferably formed by sections of the plates 1, to control propellant flow and distribution therein.

Furthermore, a bubble trap (not shown) may be provided within the outlet volume 13 at the outlet duct 15, and preferably this is formed by sections of the plates 1 which form an annular chamber coaxial with the outlet duct with fine apertures through the side wall in the same manner as the fine apertures in the side walls 7,8.

In an alternative embodiment of the invention, the bolts 6 may be dispensed with by fusing the plates 1 together in a high temperature/pressure fusing process.

I claim:

1. A liquid vapour separator for use in a fuel tank of a space vessel, comprising first and second liquid-vapour separator walls, a vapour vent and an unvented outlet chamber having an outlet, said first and second liquid-vapour separator walls defining a first trap volume therebetween and arranged such that liquid flows into the first trap volume through said second liquid-vapour separator wall and flows from the first trap volume to the outlet chamber via said first liquid-vapour separator wall, said vapour vent being located such that vapour within the first trap volume is vented therefrom as liquid flows into the first trap volume, wherein said first liquid-vapour separator wall comprises a plurality of separator plates clamped together with engaging surfaces of adjacent plates formed with liquid-vapour separator passages between said surfaces, said passages being dimensioned so as to inhibit vapour flow whilst preferentially allowing liquid flow.

2. A liquid-vapour separator comprising a liquid trap having a first liquid-vapour separator wall which is annular and through which liquid flows to a liquid outlet, a second liquid-vapour separator wall through which liquid flows into the trap, a third liquid-vapour separator wall surrounding said first liquid-vapour separator wall so as to define a gallery therebetween which is in communication with the liquid outlet, and a vapour vent located so that vapour within the trap collects therein and is vented from the trap as liquid flows into the trap, wherein the first liquid-vapour separator wall comprises a plurality of separator plates, said separator plates being clamped together with the engaging surfaces of adjacent plates formed with liquid-vapour separator passages between said surfaces, said passages being dimensioned so as to inhibit vapour flow whilst preferentially allowing liquid flow.

3. A liquid-vapour separator according to claim 2, in which said third liquid-vapour separator wall, comprises a plurality of second separator plates clamped together with engaging surfaces of adjacent second plates formed with second liquid-vapour separator passages between said surfaces, said second passages being dimensioned so as to inhibit vapour flow whilst preferentially allowing liquid flow into said gallery.

4. A liquid-vapour separator according to claim 2, further comprising a dividing wall, said dividing wall being impermeable to liquid-vapour, and positioned within and sideways to the first liquid-vapour separator wall, which is tubular, the space within the first liquid-vapour separator wall being divided by the dividing wall into a liquid trap region and an outlet region which are connected via the gallery for the flow of liquid from the liquid trap region to the outlet region.

5. A liquid-vapour separator according to claim 4, in which baffles are positioned in at least one of the liquid trap region and the outlet region to control propellant flow.

6. A liquid-vapour separator according to claim 2, further comprising a bubble trap communicating with the outlet duct.

7. A liquid-vapour separator according to claim 2, in which said plurality of plates is clamped together by clamping means, said clamping means comprising elongate tensile members, said elongate tensile members extending through said gallery.

8. A liquid-vapour separator according to claim 2, in which said plurality of plates is clamped together by fusing said plates together.

9. A propellant tank for a space vehicle comprising a liquid-vapour separator according to claim 2.

* * * * *